United States Patent [19]

Suzuki

[11] 4,441,575
[45] Apr. 10, 1984

[54] FOUR-WHEEL VEHICLE DRIVE SYSTEM
[75] Inventor: Kunihiko Suzuki, Yokohama, Japan
[73] Assignee: Nissan Motor Company, Limited, Yokohama, Japan
[21] Appl. No.: 370,270
[22] Filed: Apr. 20, 1982
[30] Foreign Application Priority Data May 11, 1981 [JP] Japan .................................. 56-70346

[51] Int. Cl.³ ............................................. B60K 17/04
[52] U.S. Cl. ................................... 180/248; 74/694; 180/250; 180/297
[58] Field of Search .............. 180/233, 248, 249, 250, 180/297; 74/694, 695, 700, 701, 785

[56] References Cited

U.S. PATENT DOCUMENTS

| | | | |
|---|---|---|---|
| 2,595,494 | 5/1952 | Stratman | 180/49 |
| 2,882,752 | 4/1959 | Russell | 74/695 |
| 3,113,471 | 12/1968 | Gregory | 74/701 |
| 3,265,173 | 8/1966 | Russell | 192/67 |
| 3,350,960 | 11/1967 | Lamburn et al. | 74/740 |
| 3,378,093 | 4/1968 | Hill | 180/44 |
| 3,557,634 | 1/1971 | Bixby | 74/710.5 |
| 3,889,771 | 6/1975 | Kronogard | 180/44 R |
| 3,895,546 | 7/1975 | Yamaguchi et al. | 74/695 |
| 3,993,152 | 11/1967 | Fogelberg | 180/44 R |
| 4,074,591 | 2/1978 | Dick | 74/674 |
| 4,208,923 | 6/1980 | Ikegami | 74/15.63 |

FOREIGN PATENT DOCUMENTS

| | | |
|---|---|---|
| 491645 | 9/1938 | United Kingdom . |
| 887849 | 1/1962 | United Kingdom . |
| 2064449 | 6/1981 | United Kingdom . |
| 2075933 | 11/1981 | United Kingdom . |
| 2074517 | 11/1981 | United Kingdom . |
| 2074516 | 11/1981 | United Kingdom . |

Primary Examiner—John A. Pekar
Assistant Examiner—D. Lynn Fugate
Attorney, Agent, or Firm—Lane, Aitken & Kananen

[57] ABSTRACT

A four-wheel drive system for a vehicle, comprising a power unit having an output shaft in a lateral direction of the vehicle, a power transmission gear unit including transmission input and output shafts each having an axis of rotation parallel with an extension of the axis of rotation of the output shaft of the power unit; an intermediate drive gear parallel with the axes of rotation of the transmission input and output shafts, the transmission output shaft being held in driving engagement with the intermediate drive gear, a first wheel drive unit comprising differential-action power splitting means operative to split driving power from the drive gear into two power components and a differential gear assembly operative to transmit one of the two power components to a first pair of road wheels, a second wheel drive unit comprising right-angle power transfer gear means engaging the differential-action power splitting means and operative to transmit therethrough the other of the two driving power components in a fore-and-aft direction of the vehicle, and a driveline intervening between the right-angle power transfer gear means and a second pair of road wheels and driven by the driving power component transmitted through the right-angle power transfer gear means.

23 Claims, 10 Drawing Figures

FOUR-WHEEL VEHICLE DRIVE SYSTEM

FIELD OF THE INVENTION

The present invention relates to a four-wheel-drive system for a vehicle having at least two pairs of road wheels consisting of a pair of front road wheels and a pair of rear road wheels and, more particularly, to a four-wheel-drive system for such a wheeled vehicle.

SUMMARY OF THE INVENTION

In accordance with the present invention, there is provided a four-wheel drive system for a vehicle having at least first and second pairs of road wheels, comprising a power unit having an output shaft rotatable about an axis in a lateral direction of the vehicle; a power transmission gear unit including transmission input and output shafts each having an axis of rotation parallel with an extension of the axis of rotation of the output shaft of the power unit; an intermediate drive gear rotatable about an axis parallel with the respective axes of rotation of the transmission input and output shafts, the transmission output shaft being held in driving engagement with the intermediate drive gear; a first wheel drive unit comprising differential-action power splitting means operative to split driving power from the drive gear into two power components and a differential gear assembly operative to transmit one of the two power components to the first pair of road wheels; a second wheel drive unit comprising right-angle power transfer gear means engaging the differential-action power splitting means and operative to transmit therethrough the other of the two driving power components in a fore-and-aft direction of the vehicle; and a driveline operatively intervening between the right-angle power transfer gear means and the second pair of road wheels and adapted to be driven by the driving power component transmitted through the right-angle power transfer gear means.

DESCRIPTION OF THE DRAWINGS

The features and advantages of the four-wheel drive system according to the present invention will be more clearly understood from the following description in which like reference numerals and characters designate corresponding or similar members and structures throughout the figures of the drawings and in which.

DESCRIPTION OF THE PRIOR ART

Figure 1:
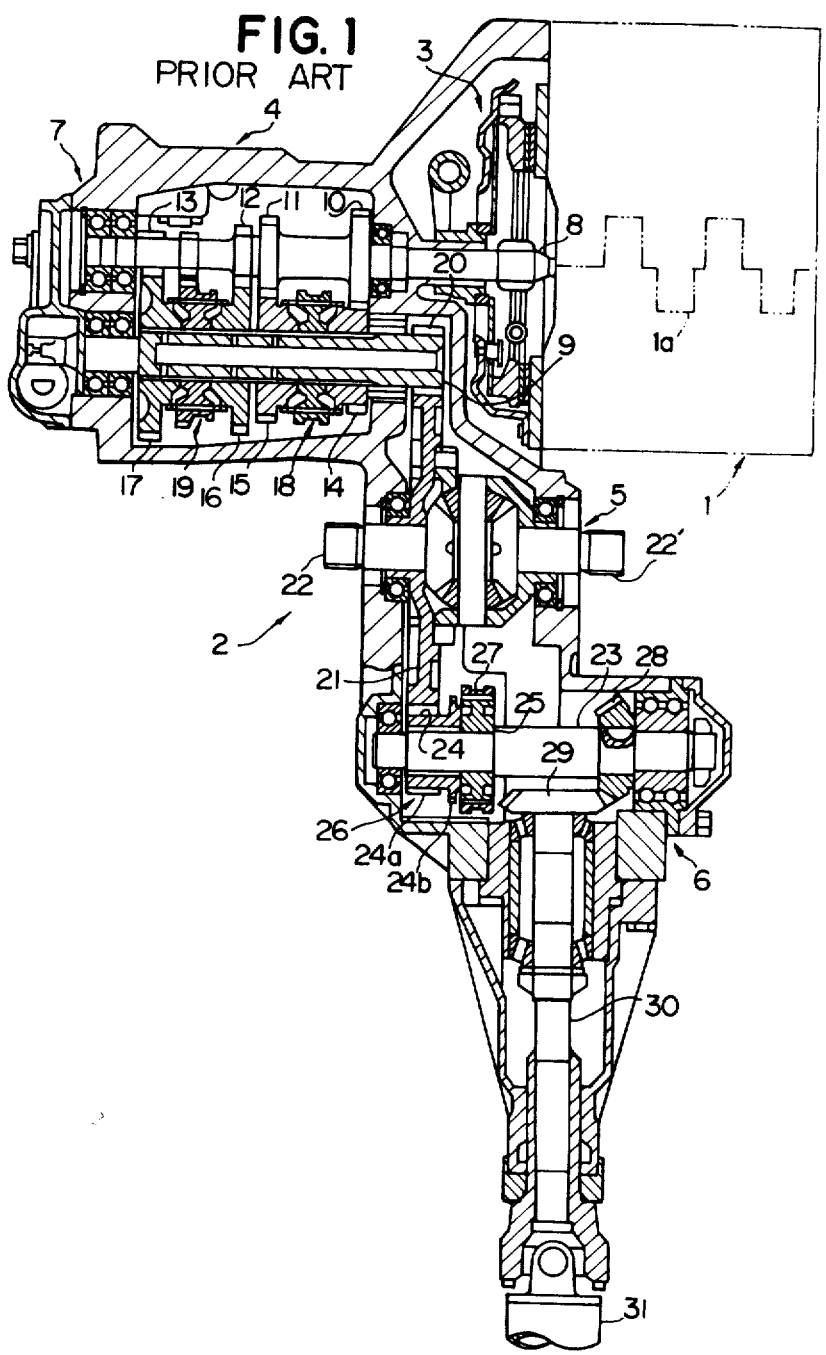
FIG. 1 is a plan view showing, in part schematically, an example of the prior-art four-wheel vehicle drive system of the type to which the present invention generally relates.

Referring to FIG. 1 of the drawings, a prior-art four-wheel drive system of the type to which the present invention generally appertains comprises an internal combustion engine 1 having a crankshaft 1a. The engine 1 is installed in a front portion of the vehicle body (not shown) and is positioned in such a manner that the crankshaft 1a extends in a lateral direction of the vehicle body. The prior-art four-wheel-drive system further comprises a transaxle mechanism 2 which includes a clutch unit 3, a power transmission gear unit 4, a front-wheel differential gear unit 5, and a rear-wheel drive unit 6, the units 3, 4, 5 and 6 being enclosed within a transaxle casing 7. The transmission gear unit 4 includes an input shaft 8 having opposite end portions respectively jounaled in the transaxle casing 7 and extending in alignment with the axis of rotation of the engine crankshaft 1a. The transmission input shaft 8 is selectively coupled to and uncoupled from the crankshaft 1a of the engine 1 through the clutch unit 3. The transmission gear unit 4 includes, in addition to the above mentioned input shaft 8, an output shaft 9 which extends in parallel with the input shaft 8 and which also has opposite end portions respectively jounaled in the transaxle casing 7. The transmission input shaft 8 has carried thereon a set of gears including drive gears 10, 11, 12 and 13 and, likewise, the transmission output shaft 9 has carried thereon a set of driven gears 14, 15, 16 and 17 which are held in mesh with the drive gears 10, 11, 12 and 13, respectively, on the transmission input shaft 8. The drive gears 10 to 13 on the transmission input shaft 8 are rotatable with the shaft 8, while the driven gears 14 to 17 on the transmission output shaft 9 are rotatable on the shaft 9. The transmission output shaft 9 has further carried thereon two synchronizer clutch assemblies 18 and 19. One synchronizer clutch assembly 18 axially intervenes between the gears 14 and 15 on the transmission output shaft 9, and the other synchronizer clutch assembly 19 intervenes between the driven gears 16 and 17 on the transmission output shaft 9 as shown.

The transmission output shaft 9 has further carried thereon a transmission output gear 20 which is fixedly mounted on an end portion of the shaft 9 and which is thus rotatable with the shaft 9. On the other hand, the front-wheel differential gear unit 5 includes an intermediate drive gear 21 rotatable about an axis parallel with the transmission input and output shafts 8 and 9 and held in mesh with the transmission output gear 20. The driving power transmitted from the transmission gear unit 4 to the differential gear unit 5 via the transmission output gear 20 and the intermediate drive gear 21 is thus once split into two power components by the differential gear unit 5. The power components are carried through front-wheel drive shafts 22 and 22' to the front wheel axles of front road wheels (not shown), respectively. Furthermore, the rear-wheel drive unit 6 includes a power transfer shaft 23 also parallel with the transmission input and output shafts 8 and 9 and rotatable on the transaxle casing 7.

The power transfer shaft 23 has carried thereon a power transfer gear 24 coaxially rotatable on the shaft 23 and consisting of a driven gear portion 24a held in mesh with the intermediate drive gear 21 and a clutch gear portion 24b axially spaced apart from the driven gear portion 24a. The transfer gear shaft 23 has further mounted thereon a clutch gear 25 coaxially rotatable with the shaft 23 and located axially adjacent the clutch gear portion 24b of the above mentioned power transfer gear 24. The clutch gear 25 and the clutch gear portion 24b of the power transfer gear 24 form part of a two-wheel/four-wheel drive selector clutch assembly 26 which further includes a coupling sleeve 27. The coupling sleeve 27 is axially movable on the clutch gear 25 into and out of engagement with the clutch gear portion 24b of the transfer gear 24 so that the power transfer gear 24 is selectively coupled to and uncoupled from the shaft 23. The power transfer shaft 23 has further carried thereon a driving bevel gear 28 which is rotatable with the shaft 23 and which is held in mesh with a driven bevel gear 29 rotatable with a drive shaft 30 extending in a fore-and-aft direction of the vehicle body. The drive shaft 30 is rotatable on the transaxle casing 7 and is coupled at its rear end to a propeller shaft 31. Though not shown in FIG. 1, the propeller shaft 31 in turn is linked at its rear end to a rear-wheel differential gear unit connected through rear-wheel drive shafts to the rear wheel axles of rear road wheels, respectively.

Problems have been encountered in a prior-art four-wheel drive system of the type above described in that the driving power to be transmitted via the front-wheel differential gear unit 5 to the front road wheels is not properly matched with the driving power to be transmitted to the rear road wheels by way of the rear-wheel drive unit 6. The problems result from the fact that the driving power delivered from the output gear 20 of the transmission gear unit 4 to the intermediate drive gear 21 is in part transmitted to the wheel axles of the front road wheels and in part to the wheel axles of the rear road wheels through the rear-wheel differential gear unit. Mainly for this reason, it happens that the radius of the turning circle of each of the front road wheels differs from that of each rear road wheel when the vehicle is making a turn. When this occurs, when, for example, the vehicle is cruising on a meandering road, not only the power train leading from the transmission gear unit to the front and rear road wheels is subjected to an unduly excessive driving torque but the wear of the road wheels, particularly, the tires thereof will be promoted. The present invention contemplates elimination of these problems encountered in an automotive vehicle using the prior-art power train of the described type.

DESCRIPTION OF THE EMBODIMENTS

Figure 2:
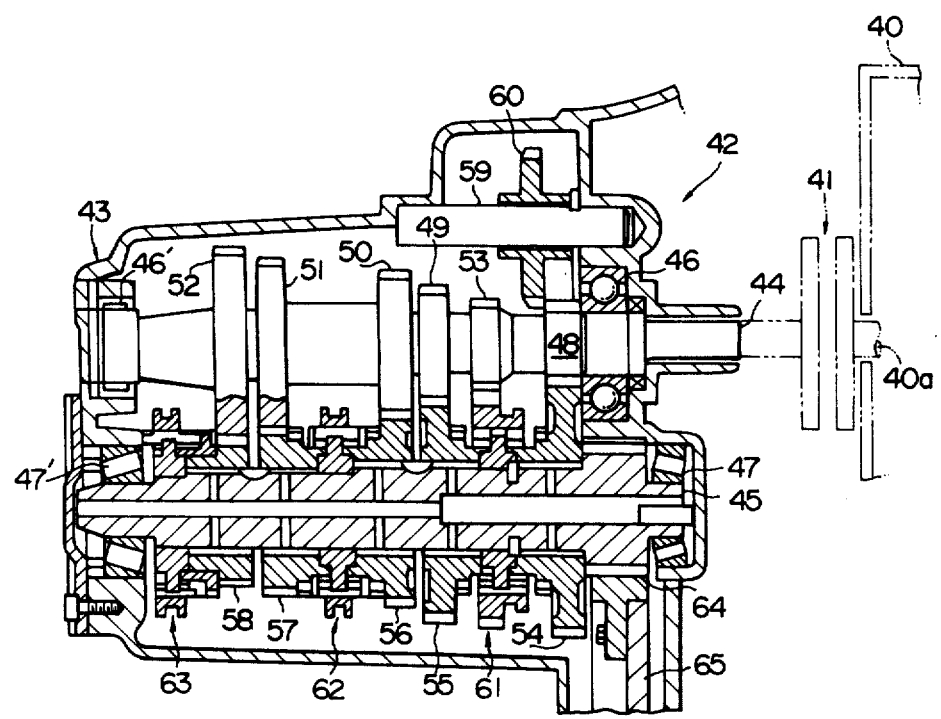
FIG. 2 is a sectional view showing, to an enlarged scale, a power transmission gear unit forming part of each of the embodiments of a four-wheel drive system according to the present invention.

Referring to FIG. 2 of the drawings, each preferred embodiment of a four-wheel drive system according to the present invention as hereinafter described comprises a power unit and a transmission-front-axle or, briefly, transaxle mechanism. The power unit is usually constituted by an internal combustion engine 40 having a power output shaft 40a which is constituted by, for example, the crankshaft of an ordinary internal combustion engine. The four-wheel drive system proposed by the present invention is intended for use in an automotive vehicle of the type having the engine positioned laterally or transversely of the vehicle body. The engine 40 herein shown is thus installed on the body structure (not shown) of a wheeled vehicle in such a manner that the output shaft 40a thereof extends in a lateral direction of the vehicle body. The four-wheel drive system embodying the present invention is further assumed, by way of example, as being of the front-engine design and, thus, the engine 40 is positioned in a front portion of the vehicle body. On the other hand, the transaxle mechanism of the four-wheel drive system according to the present invention includes a suitable clutch unit, and a power transmission gear unit. In each of the preferred embodiments of the present invention as hereinafter described, it is assumed by way of example that the clutch unit is of the mechanical friction-disc type as schematically indicated at 41 in FIG. 2 and that the power transmission gear unit is of the manually operated type as represented in its entirety by reference numeral 42 in FIG. 2. The transmission gear unit 42 as a whole is enclosed within a transaxle casing as partially shown at 43 in FIG. 2.

As shown in FIG. 2, the power transmission gear unit 42 comprises input and output shafts 44 and 45. The input shaft 44 has opposite end portions respectively jounaled in bearings 46 and 46' received in the transaxle casing 43 and extending in alignment with the axis of rotation of the engine output shaft 40a. The transmission output shaft 45 likewise has opposite end portions respectively jounaled in bearings 47 and 47' received in the transaxle casing 43 and extending in parallel with the transmission input shaft 44. The transmission input shaft 44 is selectively coupled to and uncoupled from the engine output shaft 40a through the clutch unit 41.

The transmission gear unit 42 is assumed to be of the five-forward-speed and one-reverse-speed type and comprises six input gears rotatable with the transmission input shaft 44 and consisting of first-speed to fifth-speed forward drive gears 48 to 52, and a reverse drive gear 53. On the other hand, the transmission output shaft 45 has mounted thereon five driven gears rotatable independently of one another on the shaft 45 and consisting of first-speed to fifth-speed driven gears 54 to 58. The gears 54 to 58 on the transmission output shaft 45 are held in mesh with the drive gears 48 to 52, respectively, on the transmission input shaft 44. The transmission gear unit 42 further comprises a reverse idler shaft 59 having a reverse idler gear 60 rotatable and axially slidable thereon. The reverse idler shaft 59 also extends in parallel with the transmission input shaft 44 and has opposite end portions secured to the transaxle casing 43.

The transmission gear unit 42 is further assumed as being of the synchronized type and comprises three synchronizer clutch assemblies each of which is rotatable with the transmission output shaft 45. The synchronizer clutch assemblies consist of a first-second speed synchronizer clutch assembly 61, a third-fourth speed synchronizer clutch assembly 62, and a fifth speed synchronizer clutch assembly 63. The first-second speed synchronizer clutch assembly 61 is provided between the first-speed and second-speed driven gears 54 and 55 and is selectively engageable with these gears 54 and 55. Likewise, the third-fourth speed synchronizer clutch assembly 62 is provided between the third-speed and fourth-speed driven gears 56 and 57 and is selectively engageable with the gears 56 and 57. On the other hand, the fifth-speed synchronizer clutch assembly 63 is provided in association with the fifth-speed driven gear 58 and is engageable with the gear 58. The reverse idler gear 60 on the idler shaft 59 is operable to intervene between the reverse drive gear 53 on the transmission input shaft 44 and the first-second speed synchronizer clutch assembly 61. The transmission output shaft 45 has fixedly mounted thereon a transmission output gear 64 which is thus rotatable with the transmission output shaft 45.

Figure 3:
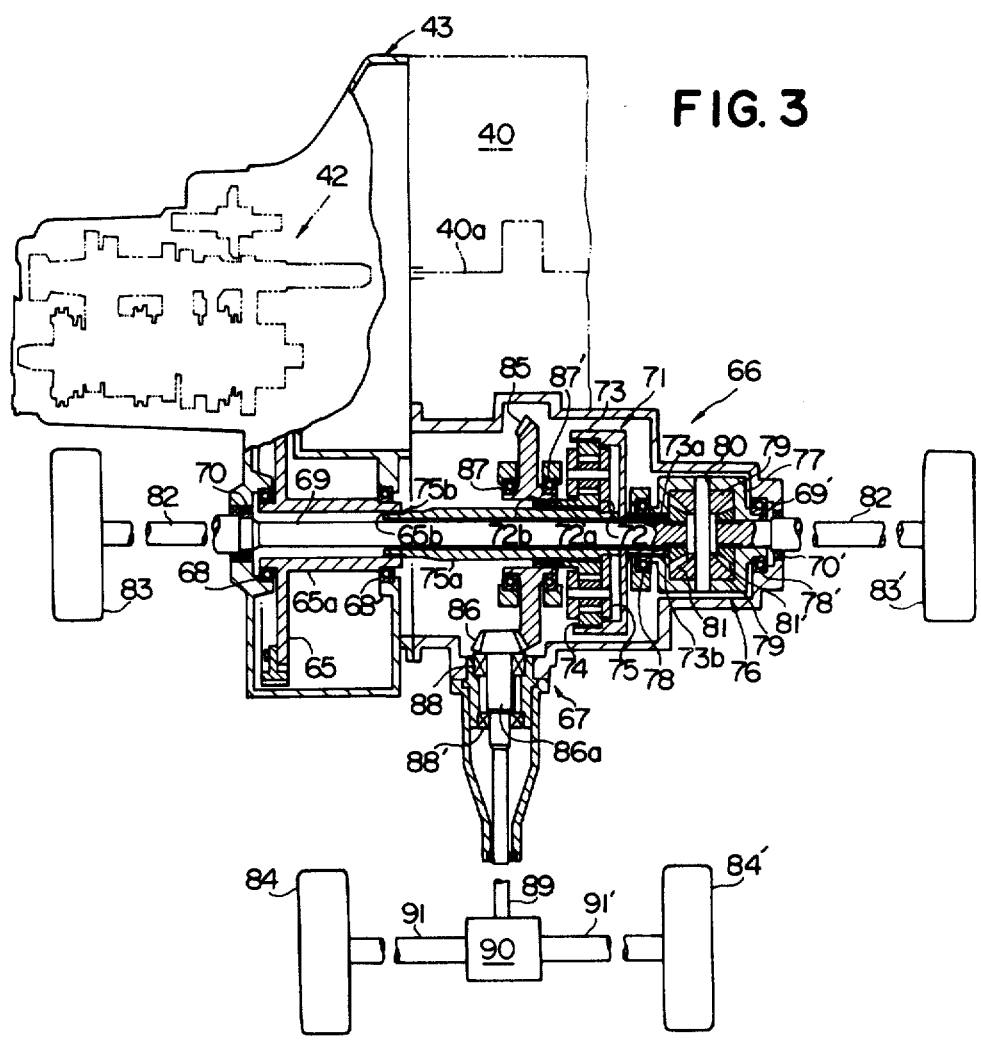
FIGS. 3 to 10 are sectional views showing the general constructions and arrangements of first to eighth preferred embodiments, respectively, of a four-wheel drive system according to the present invention.

Turning now to FIG. 3, the transaxle mechanism of the four-wheel drive system constituting the first preferred embodiment of the present invention comprises, in addition to the above described power transmission gear unit 42, an intermediate drive gear 65, a front-wheel drive unit 66 and a rear-wheel drive gear unit 67. The gear 65, drive unit 66 and gear unit 67 are also enclosed within the transaxle casing 43. The intermediate drive gear 65 is held in mesh with the above mentioned transmission output gear 64 and is rotatable with respect to the transaxle casing 43 about an axis parallel with the axis of rotation of the transmission output shaft 45. The intermediate drive gear 65 has an axial boss portion journaled in a bearing 68 and a hollow axial extension 65a having an end portion journaled in a bearing 68', each of the bearings 68 and 68' being received in the transaxle casing 43. The hollow axial extension 65a of the intermediate drive gear 65 has an internally serrated inner peripheral portion 65b as shown. The front-wheel drive unit 66 further comprises a pair of side gear shafts 69 and 69' extending in parallel with the input and output shafts 44 and 45 of the transmission gear unit 42 and having axially outer end portions journaled in bearings 70 and 70', respectively, which are received in the transaxle casing 43. The side gear shafts 69 and 69' have a common axis of rotation which is in part coincident with the axis of rotation of the intermediate drive gear 65 and which is thus parallel with the input and output shafts 44 and 45 of the transmission gear unit 42. One of the side gear shafts such as the side gear shaft 69 as shown has an axial portion coaxially surrounded by a planetary gear assembly 71 which constitutes differential-action power splitting means in a four-wheel drive system according to the present invention.

The planetary gear assembly 71 comprises an axially bored, externally toothed sun gear 72 coaxially surrounding an axial portion of the side gear shaft 69, an internally toothed ring gear 73 coaxially encircling the sun gear 72 and two or more planet pinions 74 each intervening between the sun gear 72 and the ring gear 73. The sun gear 72 is rotatable about an axis aligned with the axis of rotation of the intermediate drive gear 65 and is formed with an axial bore. The planet pinions 74 are held in mesh with both of the sun gear 72 and the ring gear 73 and are connected together by a pinion carrier 75 which is rotatable about the common axis of rotation of the sun gear 72 and the ring gear 73. The planet pinions 74 are, thus, not only rotatable individually about the respective axes of rotation thereof with respect to the pinion carrier 75 but revolvable together about the common axis of rotation of the sun and ring gears 72 and 73 with respect to the transaxle casing 43. The pinion carrier 75 has a hollow axial extension 75a coaxially surrounding an axial portion of the side gear shaft 69 and axially extending toward the axial extension 65a of the intermediate drive gear 65. The axial extension 75a of the pinion carrier 75 has a serrated outer peripheral portion 75b projecting into and splined to the serrated inner peripheral portion 65b of the axial extension of the intermediate drive gear 65. The pinion carrier 75 is, accordingly, rotatable with the drive gear 65 about the center axis of the side gear shaft 69. The sun gear 72 also has a hollow axial extension 72a coaxially surrounding an axial portion of the above mentioned axial extension 75a of the pinion carrier 75 and axially extending toward the axial extension 65a of the intermediate drive gear 65. The ring gear 73 likewise has a hollow axial extension 73a extending opposite to the axial extension 75a of the pinion carrier 75 and coaxially surrounding an axial portion of the side gear shaft 69. The axial extension 73a of the ring gear 73 is formed with a serrated outer peripheral portion 73b.

The side gear shafts 69 and 69' axially extend in opposite directions laterally of the vehicle body from a front-wheel differential gear assembly 76 which forms part of the front-wheel drive unit 66 and which is thus also enclosed within the transaxle casing 43. As shown in FIG. 3, the differential gear assembly 76 comprises a differential gear casing 77 which is rotatable about an axis aligned with the common axis of rotation of the sun and ring gears 72 and 73 of the planetary gear assembly 71. The gear casing 77 has opposite axial boss portions respectively journaled in bearings 78 and 78' received in the transaxle casing 43 and has carried therein a pair of differential bevel pinions 79 which are rotatably mounted on common pinion cross shaft 80 secured to the gear casing 77 and extending at right angles to the axis of rotation of the gear casing 77. The individual bevel pinions 79 are, thus, rotatable not only together with the gear casing 77 and cross shaft 80 about the axis of rotation of the gear casing 77 but also independently of one another about the center axis of the cross shaft 80, viz., an axis perpendicular to the axis of rotation of the gear casing 77. The gear casing 77 has one of its axial boss portions internally serrated and splined to the serrated outer peripheral portion 73b of the axial extension 73a of the ring gear 73 of the planetary gear assembly 71. The differential gear casing 77 is thus rotatable about the axis of rotation thereof together with the ring gear 73.

The differential bevel pinions 79 intervene between and are held in mesh with a pair of differential side bevel gears 81 and 81' which are also carried in the differential gear casing 77 and which are rotatable about the axis of rotation of the gear casing 77. The side bevel gears 81 and 81' are fixedly connected to or splined to axially inner end portions of the side gear shafts 69 and 69', respectively, extending into the gear casing 77 in a lateral direction of the vehicle body. One side gear shaft 69 extends outwardly from the gear casing 77 in part through the axial bore in the sun gear 72 and through the axial extension 75a of the pinion carrier 75 and in part through the axial extension 65a of the intermediate drive gear 65. The other side gear shaft 69' extends outwardly from the gear casing 77 in the opposite direction to the side gear shaft 69. The side gear shafts 69 and 69' form part of front axle assemblies and are operatively connected at their axially outer ends to front wheel drive shafts 82 and 82', respectively. The front wheel drive shafts 82 and 82' also extend in a lateral direction of the vehicle body and are connected at their outer axial ends to the front wheel axles (not shown) for front road wheels 83 and 83', respectively.

As previously mentioned briefly, the planetary gear assembly 71 serves as differential-action power splitting means and is thus operative to split the driving power from the intermediate drive gear 65 into two driving power components with different revolution speeds. One of the two driving power components is transmitted to the respective wheel axles for the front road wheels 83 and 83' and the other thereof is to be transmitted via the previously mentioned rear-wheel drive gear unit 67 to a rear-wheel driveline which terminates in the wheel axles for rear road wheels 84 and 84'. The rear-wheel drive gear unit 67 is enclosed within a rear extension of the transaxle casing 43 and comprises right-angle power transfer gear means operative to transmit the other of the above mentioned driving power components to the rear-wheel driveline in a fore-and-aft direction of the vehicle body. In the rear-wheel drive gear unit 67 of the embodiment shown in FIG. 3, such right-angle power transfer gear means is constituted by the combination of a driving bevel gear 85 and a driven bevel gear 86. The driving bevel gear 85 has a serrated inner peripheral wall splined to the serrated outer peripheral portion 72b of the axial extension 72a of the sun gear 72 of the planetary gear assembly 71 and is rotatable with the sun gear 72 about the center axis of the side gear shaft 69. The driving bevel gear 85 has opposite axial boss portions journaled in bearings 87 and 87' received in the transaxle casing 43. The driven bevel gear 86 is held in mesh with the driving bevel gear 85 and has a rearward axial extension 86a journaled in bearings 88 and 88' also received in the rear extension of the transaxle casing 43. The driven bevel gear 86 is rotatable about an axis extending at right angles to the axis of rotation of the driving bevel gear 85, viz., in a fore-and-aft direction of the vehicle body. The axial extension 86a of the driven bevel gear 86 projects rearwardly from the rear extension of the transaxle casing 43 through an opening formed in the extension and is connected at the rear end thereof to the propeller shaft 89 also extending rearwardly from the gear 86 in a fore-and-aft direction of the vehicle body. The propeller shaft 89 forms part of a driveline for the rear road wheels 84 and 84' and is connected at the rear end thereof to a rear-wheel differential gear assembly 90. The differential gear assembly 90 is per se constructed similarly to the previously described differential gear assembly 76 of the front-wheel drive unit 66. Thus, the gear assembly 90 includes side bevel gears respectively connected to rear-wheel drive shafts 91 and 91' which extend also in a lateral direction of the vehicle body and which are connected at their outer axial ends to the rear wheel axles (not shown) for the rear road wheels 84 and 84', respectively.

Description will now be made regarding the operation of the four-wheel drive system constructed and arranged as hereinbefore described with reference to FIGS. 2 and 3.

When the engine 40 is in operation and the clutch unit 41 is in a coupled condition, the driving power delivered from the output shaft 40a of the engine 40 is transmitted through the clutch unit 41 to the input shaft 44 of the power transmission gear unit 42 shown in FIG. 2. If, under these conditions, one of the driven gears 54 to 58 on the transmission output shaft 45 is coupled to the shaft 45 through the associated synchronizer clutch assembly 61, 62 or 63 or the reverse idler gear 60 is brought into mesh with the reverse drive gear 53 and the synchronizer clutch 61, the driving power carried to the transmission input shaft 44 is transmitted to the transmission output shaft 45 through the selected pair of gears on the shafts 44 and 45 or through the gears 53 and 60. The transmission output shaft 45 is, as a consequence, driven for rotation at a speed proportioned in the selected ratio to the rotational speed of the transmission input shaft 44. The rotation of the transmission output shaft 45 is transmitted via the transmission output gear 64 on the shaft 45 to the intermediate drive gear 65 which is held in constant mesh with the transmission output gear 64. The rotation of the intermediate drive gear 65 in turn is carried to the pinion carrier 75 of the planetary gear assembly 71 through the engagement between the respective axial extensions 65a and 75a of the drive gear 65 and the pinion carrier 75. The pinion carrier 75 is accordingly driven for rotation about the axis thereof and causes the individual planet pinions 74 to revolve with respect to the transaxle casing 43 around the common axis of rotation of the sun gear 72 and ring gear 73 and to concurrently rotate with respect to the pinion carrier 75 about the respective center axes thereof.

The driving power carried to the pinion carrier 75 is, as a consequence, split into two driving power components, one of which is imparted to the sun gear 72 and the other of which is imparted to the ring gear 73. The driving power component imparted to the ring gear 73 is transmitted through the axial extension 73a thereof to the differential gear assembly 76 and drives the differential casing 77. On the other hand, the driving power component imparted to the sun gear 72 is transmitted through the axial extension 72a thereof to the driving bevel gear 85 of the rear-wheel drive gear unit 67. In the differential gear assembly 76, the differential gear casing 77 is thus driven for rotation with the ring gear 73 and drives the differential bevel pinions 79 for rotation with the casing 77 about the center axis of the cross shaft 80. The differential bevel pinions 79 in turn drive the differential side bevel gears 81 and 81' for rotation with respect to the gear casing 77 about an axis at right angles to the center axis of the cross shaft 80. Thus, the driving power transmitted to the differential gear assembly 76 of the front-wheel drive unit 66 is further split into two output components, which are respectively transmitted through the side gear shafts 69 and 69' and front-wheel drive shafts 82 and 82' to the wheel axles for the front road wheels 83 and 83', respectively. On the other hand, the driving power transmitted from the sun gear 72 of the planetary gear assembly 71 to the driving bevel gear 85 of the rear-wheel drive unit 67 is transmitted to the driven bevel gear 86 of the unit 67 and drives the bevel gear 86 for rotation about its axis in a fore-and-aft direction of the vehicle body. The rotation of the driven bevel gear 86 in turn is transmitted to the propeller shaft 89 and by way of the propeller shaft 89 to the rear-wheel differential gear assembly 90. The rear-wheel differential gear assembly 90 further splits the input driving power into two output power components and drives the rear-wheel drive shafts 91 and 91'. The drive axles for the rear road wheels 84 and 84' are thus driven for rotation about the respective axes thereof.

In the embodiment of the present invention as above described, the planetary gear assembly 71 included in the front-wheel drive unit 66 is operative to split input driving power into two output power components with different revolution speeds. One of the output power components is transmitted to the front road wheels 83 and 83' via the differential gear assembly 76 and the other thereof is transmitted to the rear road wheels 84 and 84' via the rear-wheel differential gear assembly 90. This permits the front road wheels 83 and 83' and the rear road wheels 84 and 84' to rotate at speeds different from one another due to the differential action of the planetary gear assembly 71 or, more specifically, the automatically adjusted difference between the speeds of rotation of the sun and ring gears 72 and 73 thereof. Another outstanding advantage of the embodiment of FIG. 3 is that the right-angle power transfer means forming part of the rear-wheel drive gear unit 67 is constructed simply by the combination of the two bevel gears 85 and 86 which are useful for dispensing with the intricate right-angle power transfer gear mechanism required in a prior-art four-wheel drive system of, for example, the type previously described with reference to FIG. 1.

Figure 4:
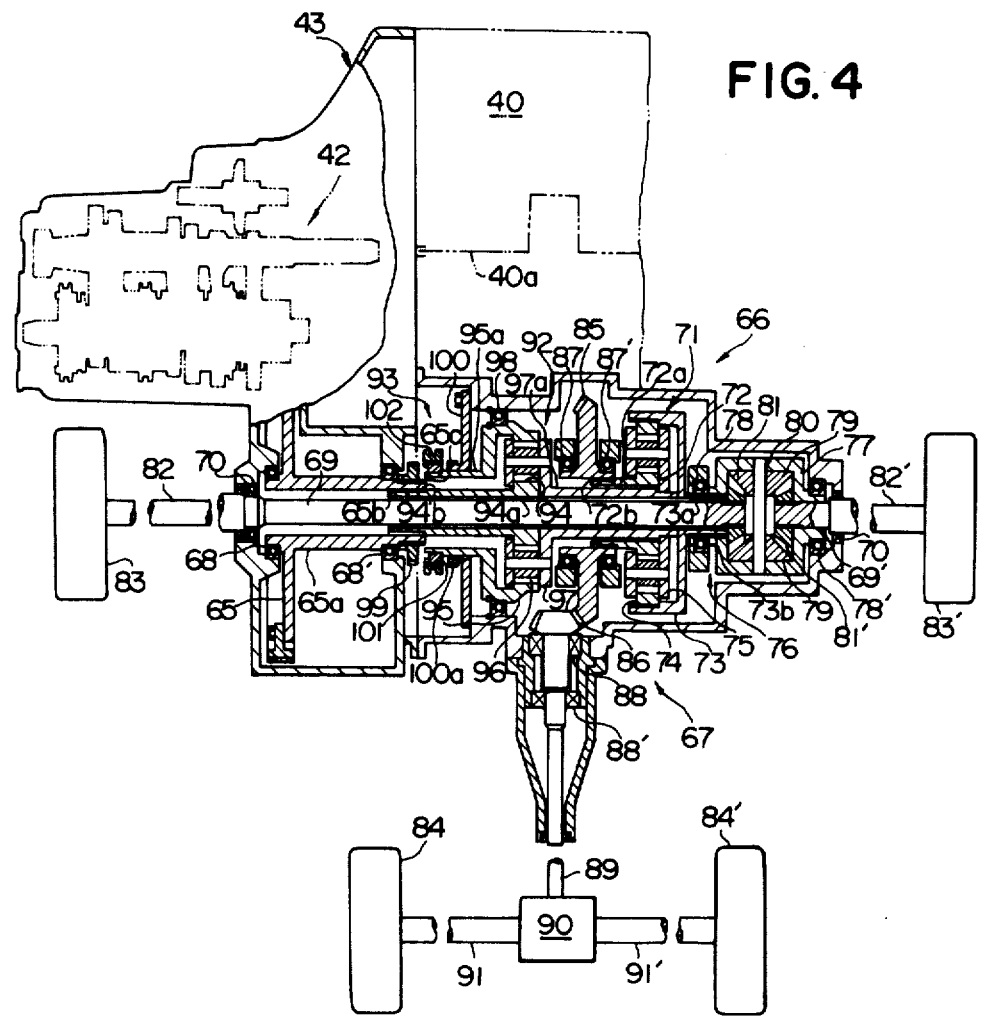

A second preferred embodiment of a four-wheel drive system according to the present invention is as shown in FIG. 4. The embodiment herein shown is characterized by the provision of a second planetary gear assembly 92 in addition to the differential-action or first planetary gear assembly 71 provided in the front-wheel drive unit 66 in the embodiment hereinbefore described with reference to FIG. 3. The second planetary gear assembly 92 forms part of low-and-high speed shifting means which further comprises a low-and-high speed shift clutch mechanism 93 provided in combination with the second planetary gear assembly 92. In the embodiment of FIG. 4, the second planetary gear assembly 92 is shown arranged axially between the intermediate drive gear 65 and the driving bevel gear 85 of the rear-wheel drive gear unit 67 in such a manner that the driving bevel gear 85 axially intervenes between the first and second planetary gear assemblies 71 and 92. Furthermore, the axial extension 65a of the intermediate drive gear 65 has an externally serrated outer peripheral portion 65c in addition to the previously mentioned internally serrated inner peripheral portion 65b thereof.

Similar to the first planetary gear assembly 71, the second planetary gear assembly 92 comprises an externally toothed sun gear 94 coaxially surrounding an axial portion of the side gear shaft 69, an internally soothed ring gear 95 coaxially encircling the sun gear 94 and two or more planet pinions 96 each intervening between the sun gear 94 and the ring gear 95. The sun gear 94 is rotatable about an axis aligned with the axis of rotation of the intermediate drive gear 65. The planet pinions 96 are held in mesh with the sun gear 94 and the ring gear 95 and are connected together by a pinion carrier 97 rotatable about the common axis of rotation of the sun gear 94 and the ring gear 95. The planet pinions 96 are thus not only rotatable individually about the respective axes of rotation thereof with respect to the pinion carrier 96 but revolvable together about the common axis of rotation of the sun and ring gears 94 and 95 with respect to the transaxle casing 43. The sun gear 94 has a hollow axial extension 94a surrounding an axial portion of the side gear shaft 69 and extending in alignment with the axial extension 97a of the pinion carrier 97 of the second planetary gear assembly 92 but toward the axial extension 65a of the intermediate drive gear 65. The axial extension 94a of the sun gear 94 has a serrated outer peripheral portion 94b projecting into and splined to the serrated inner peripheral portion 65b of the axial extension 65a of the intermediate drive gear 65. The sun gear 94 is, accordingly, rotatable with the drive gear 65 about the center axis of the side gear shaft 69. The pinion carrier 97 has a hollow axial extension 97a coaxially surrounding an axial portion of the side gear shaft 69 and extending opposite to the axial extension 94a of the sun gear 94. The axial extension 97a of the pinion carrier 97 is securely connected at its leading end to the pinion carrier 75 of the first planetary gear assembly 71. The ring gear 95 is rotatably received in the transaxle casing 43 by means of a bearing 98 and has a hollow axial extension 95a coaxially surrounding the axial extension 94a of the sun gear 94.

Basically, the above mentioned low-and-high speed shift clutch mechanism 93 is adapted to have the ring gear 95 of the second planetary gear assembly 92 coupled selectively to the above described intermediate drive gear 65 and to the transaxle casing 43. For this purpose, the shift clutch mechanism 93 comprises at least three clutch elements consisting of a first clutch element rotatable with the intermediate drive gear 65, a second clutch element secured to the transaxle casing 43, and a third clutch element rotatable with the ring gear 95 of the second planetary gear assembly 92 and selectively engageable with the first and second clutch elements. The three clutch elements are arranged in series between the intermediate drive gear 65 and the second planetary gear assembly 92 with the third clutch element located between the first and second clutch elements and arranged to be axially movable selectively into engagement with the first clutch element or the second clutch element. In the embodiment herein shown, the first clutch element is constituted by an externally serrated annular member 99 having a serrated inner peripheral portion splined to the above mentioned serrated outer peripheral portion 65c of the axial extension 65a of the intermediate drive gear 65. The second clutch element is constituted by a reaction member 100 fixedly attached to the transaxle casing 43 and formed with a circular opening allowing the hollow axial extension 95a of the ring gear 95 to axially extend therethrough toward the axial extension 65a of the intermediate drive gear 65. The reaction member 100 has an externally serrated annular portion 100a coaxial with the side gear shaft 69. The axial extension 95a of the ring gear 95 has fixedly mounted on its outer peripheral surface an externally serrated annular sleeve carrier member 101 to which an internally serrated coupling sleeve 102 is splined. The sleeve carrier member 101 is located axially between the externally serrated annular portion 100a of the reaction member 100 and the externally serrated annular member 99 so that the coupling sleeve 102 is axially movable on the sleeve carrier member 101 in a first direction into engagement with the externally serrated annular member 99 on the axial extension 65a of the intermediate drive gear 65 and in a second direction into engagement with the externally serrated annular portion 100a of the reaction member 100. The coupling sleeve 102 thus constitutes the above mentioned third clutch element of the low-and-high speed shift clutch mechanism 93.

When, in operation, the driving power delivered from the output gear 64 (FIG. 2) of the transmission gear unit 42 is transmitted via the intermediate drive gear 65 to the sun gear 94 of the second planetary gear assembly 92 through the engagement between the respective axial extensions 65a and 94a of the drive gear 65 and the sun gear 94, it follows that the individual planet pinions 96 of the gear assembly 92 are driven to rotate with respect to the pinion carrier 97 about the respective center axes thereof and accordingly revolve with respect to the transaxle casing 43 around the common axis of rotation of the sun and ring gears 94 and 95. This causes the pinion carrier 97 to rotate also about the common axis of rotation of the sun and ring gears 94 and 95.

If, in this instance, the coupling sleeve 102 of the low-and-high speed shift clutch mechanism 93 is held in the axial position engaging the serrated annular member 99 on the axial extension 65a of the intermediate drive gear 65, the drive gear 65 is drivingly connected not only to the sun gear 94 but to the ring gear 95 of the planetary gear assembly 92 through the annular member 99, the coupling sleeve 102 and the sleeve carrier member 101 on the axial extension 95a of the ring gear 97. Under these conditions, the sun gear 94, ring gear 95, planet pinions 96 and pinion carrier 97 are driven for rotation as a single unit about the center axis of the sun gear 94. The pinion carrier 97 of the second planetary gear assembly 92 is therefore driven for rotation at a speed equal to the revolution speed of the intermediate drive gear 65. If, however, the coupling sleeve 102 of the clutch mechanism 93 is held in the axial position engaging the serrated annular portion 100a of the reaction member 100, the sleeve carrier member 101 and accordingly the ring gear 95 of the planetary gear assembly 92 are locked up to the transaxle casing 43 so that the ring gear 95 is held at a standstill. Under these conditions, the pinion carrier 97 is driven for rotation about the common axis of rotation of the sun and ring gears 94 and 95 at a speed lower than and proportional to the revolution speed of the intermediate drive gear 65. Driving power is thus transmitted from the intermediate drive gear 65 to the pinion carrier 97 of the second planetary gear assembly 92 at two different speeds depending upon the axial positions of the coupling sleeve 102 with respect to the annular member 99 on the axial extension 65a of the intermediate drive gear 65 and the reaction member 100 secured to the transaxle casing 43.

The second planetary gear assembly 92 delivers its output driving power from the pinion carrier 97 thereof to the pinion carrier 75 of the first planetary gear assembly 71 through the axial extension 97a of the pinion carrier 97, thereby enabling the first planetary gear assembly 71 to deliver two driving power components from the sun and ring gears 72 and 74, respectively, thereof, as in the embodiment of FIG. 3.

Figure 5:
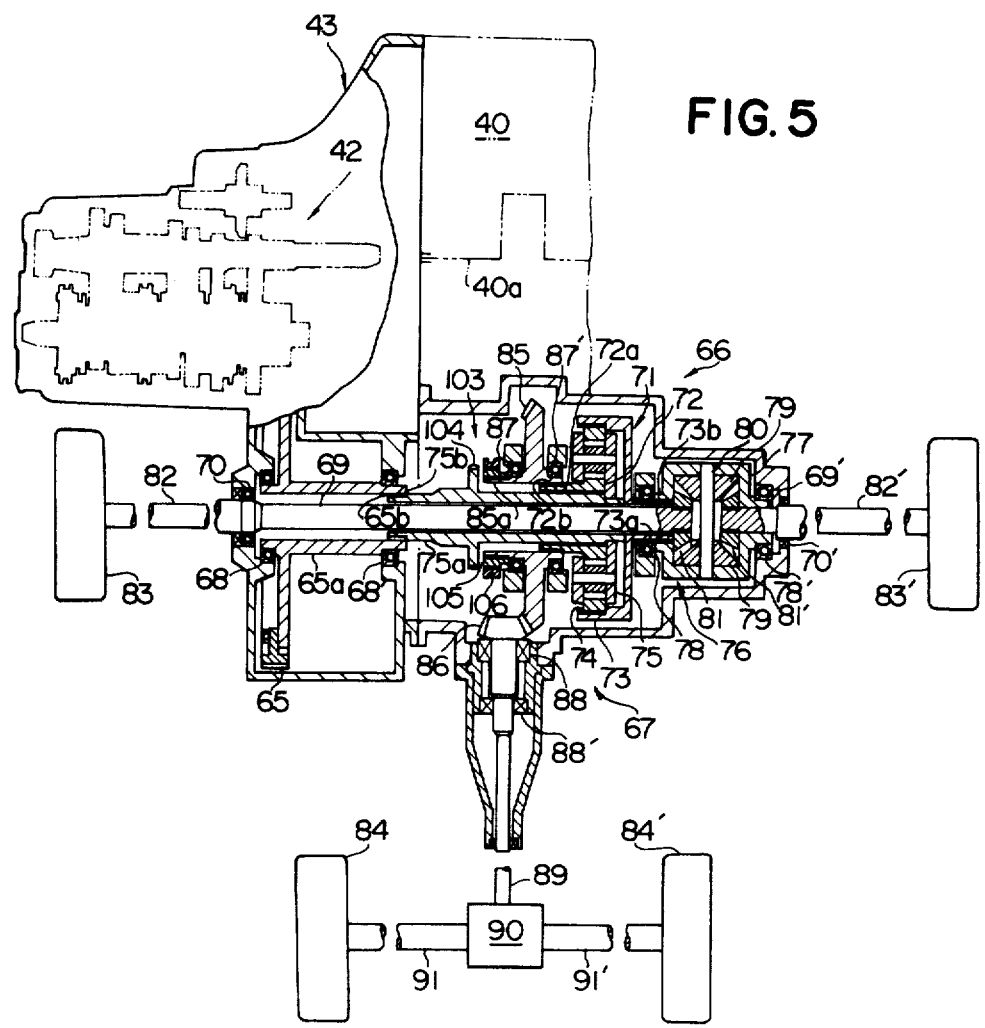

A third preferred embodiment of a four-wheel drive system according to the present invention is shown in FIG. 5. The embodiment herein shown features provision of a lock-up clutch mechanism 103 in combination with the differential-action planetary gear assembly 71 of the front-wheel drive unit 66. The embodiment herein shown is in other respects constructed and arranged similarly to the embodiment hereinbefore described with reference to FIG. 3.

In the embodiment shown in FIG. 5, the lock-up clutch mechanism 103 is adapted to have the pinion carrier 75 of the planetary gear assembly 71 selectively locked up to the sun gear 72 through the clutch mechanism 103 and the driving bevel gear 85 of the rear-wheel drive gear unit 67 so as to neutralize the differential action of the planetary gear assembly 71 and to enable the driving bevel gear 85 to be driven for rotation with the intermediate drive gear 65 when desired. For this purpose, one of the axial boss portions of the driving bevel gear 85 has an axial extension 85a coaxially surrounding an axial portion of the hollow extension 72a of the sun gear 72 of the planetary gear assembly 71 as shown.

Basically, the above mentioned lock-up clutch mechanism 103 comprises at least three clutch elements consisting of a first clutch element rotatable with the intermediate drive gear 65, a second clutch element rotatable with the sun gear 72 of the planetary gear assembly 71, and a third clutch element rotatable with one of the first and second clutch elements and axially movable into and out of engagement with the other of the first and second clutch elements. In the embodiment herein shown, the first and second clutch elements are arranged in series between the intermediate drive gear 65 and the driving bevel gear 85 and are constituted respectively by an externally serrated annular member 104 rotatable with the axial extension 75a of the pinion carrier 75 and an externally serrated annular member 105 secured or splined to the above mentioned axial extension 85a of the driving bevel gear 85. The externally serrated annular member 104 constituting the first clutch element is shown integral with and thus forming a portion of the extension 75a of the pinion carrier 75, and the externally serrated annular member 105 constituting the second clutch element is located axially adjacent to the annular member 104. On the other hand, the third clutch element of the lock-up clutch mechanism 103 is constituted by an internally serrated coupling sleeve 106 which is splined to one of the annular members such as the annular member 105 as shown and is axially movable on the annular member 105 selectively into and out of engagement with the externally serrated annular member 104.

When, in operation, the driving power delivered from the output gear 64 (FIG. 2) of the transmission gear unit 42 is transmitted via the intermediate drive gear 65 to the pinion carrier 75 of the planetary gear assembly 71 through the engagement between the respective axial extensions 65a and 75a of the drive gear 65 and the pinion carrier 75, the driving power thus carried to the pinion carrier 75 is split into two driving power components, one of which is imparted to the sun gear 72 and the other of which is imparted to the ring gear 73 as described in regard to the embodiment of FIG. 3. The power component imparted to the ring gear 73 is transmitted through the axial extension 73a thereof to the differential gear assembly 76 and drives the differential casing 77, while the driving power component imparted to the sun gear 72 is transmitted through the axial extension 72a thereof to the driving bevel gear 85 of the rear-wheel drive gear unit 67.

If, in this instance, the coupling sleeve 106 on the externally serrated annular member 105 of the lock-up clutch mechanism 103 is held in the axial position disengaged from the externally serrated annular member 104 on the axial extension 75a of the pinion carrier 75, the driving bevel gear 85 and accordingly the sun gear 72 of the planetary gear assembly 71 are permitted to rotate at a speed different from the speed of rotation of the pinion carrier 75. The planetary gear assembly 71 is thus enabled to produce a differential speed between the sun gear 72 and the ring gear 73 thereof and as a consequence, a differential speed between each of the front road wheels 83 and 83' and each of the rear road wheels 84 and 84'. If, on the other hand, the coupling sleeve 106 of the clutch mechanism 103 is held in the axial position engaging the serrated annular member 104 on the extension 75a of the pinion carrier 75, then the driving bevel gear 85 and accordingly the sun gear 72 of the planetary gear assembly 71 are caused to rotate with the pinion carrier 75. The pinion carrier 75 being thus locked up to the sun gear 72, all the rotary elements of the planetary gear assembly 71 are caused to rotate as a single unit with the intermediate drive gear 65 and the driving bevel gear 85. Under these conditions, the differential action of the planetary gear assembly 71 is neutralized so that the front-wheel differential gear assembly 76 and the rear-wheel drive gear unit 67, respectively are driven with power components at equal speeds.

Figure 6:
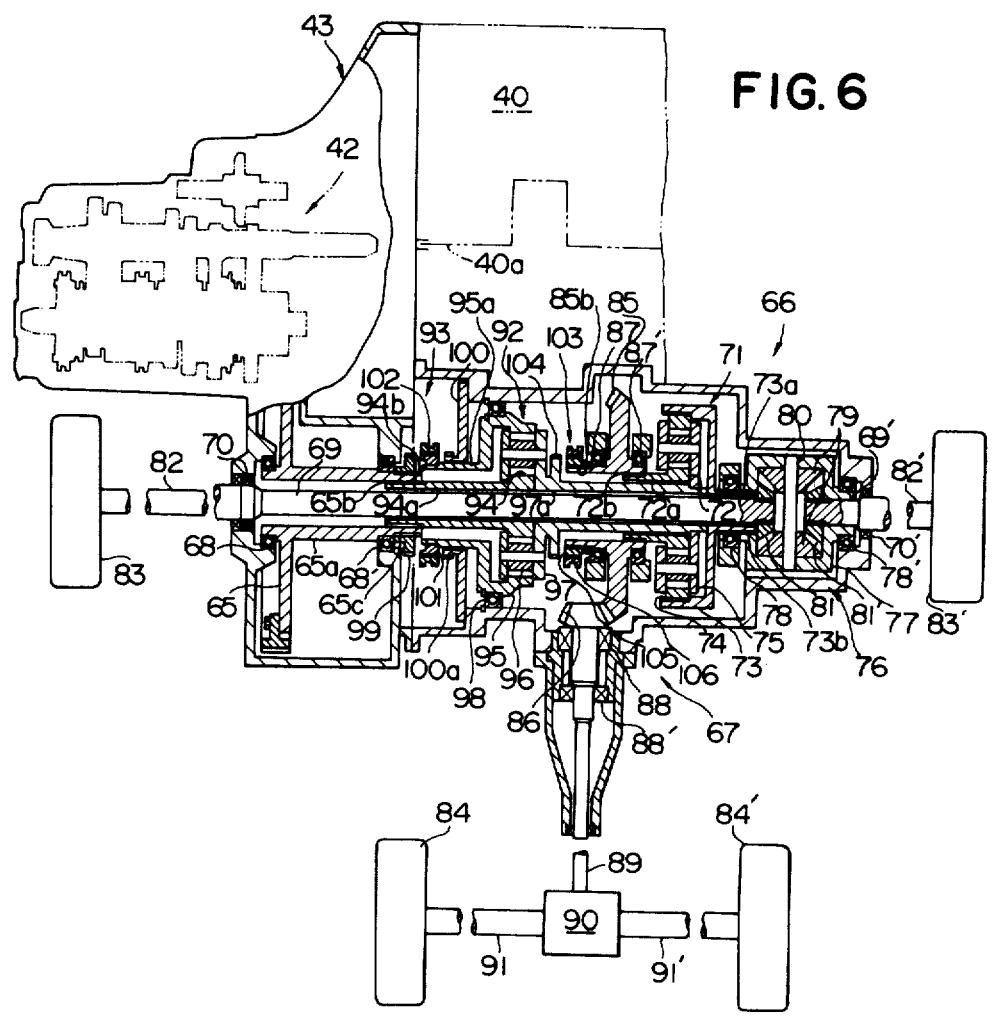

A fourth preferred embodiment of a four-wheel drive system according to the present invention is shown in FIG. 6. The embodiment herein shown is also similar to the first embodiment of the present invention but features provision of both the second planetary gear assembly 92 and low-and-high speed shift clutch mechanism 93 provided in the second embodiment shown in FIG. 4 and the lock-up clutch mechanism 103 provided in the third embodiment of FIG. 5. In the embodiment shown in FIG. 6, the lock-up clutch mechanism 103 is provided axially intermediate between the first and second planetary gear assemblies 71 and 92. The construction and arrangement of the four-wheel drive system shown in FIG. 6 and accordingly the manners in which the system is to operate will therefore be apparent from the description regarding the first, second and third embodiments of the present inevntion as thus far made with reference to FIGS. 3, 4 and 5, respectively.

While the planetary gear assembly 71 used as differential-action power splitting means in each of the embodiments hereinbefore described with reference to FIGS. 3 to 6 is constructed and arranged so that the ring gear 73 thereof acts as an output member for the front road wheels 83 and 83' and the sun gear 72 thereof acts as an output member for the rear road wheels 84 and 84', the differential-action power splitting means in a four-wheel system according to the present invention may be constituted by a planetary gear assembly having the sun and ring gears arranged to act conversely to their respective counterparts in the planetary gear assembly 71. FIGS. 7 to 10 of the drawings show embodiments each using such a differential-action planetary gear assembly.

Figure 7:
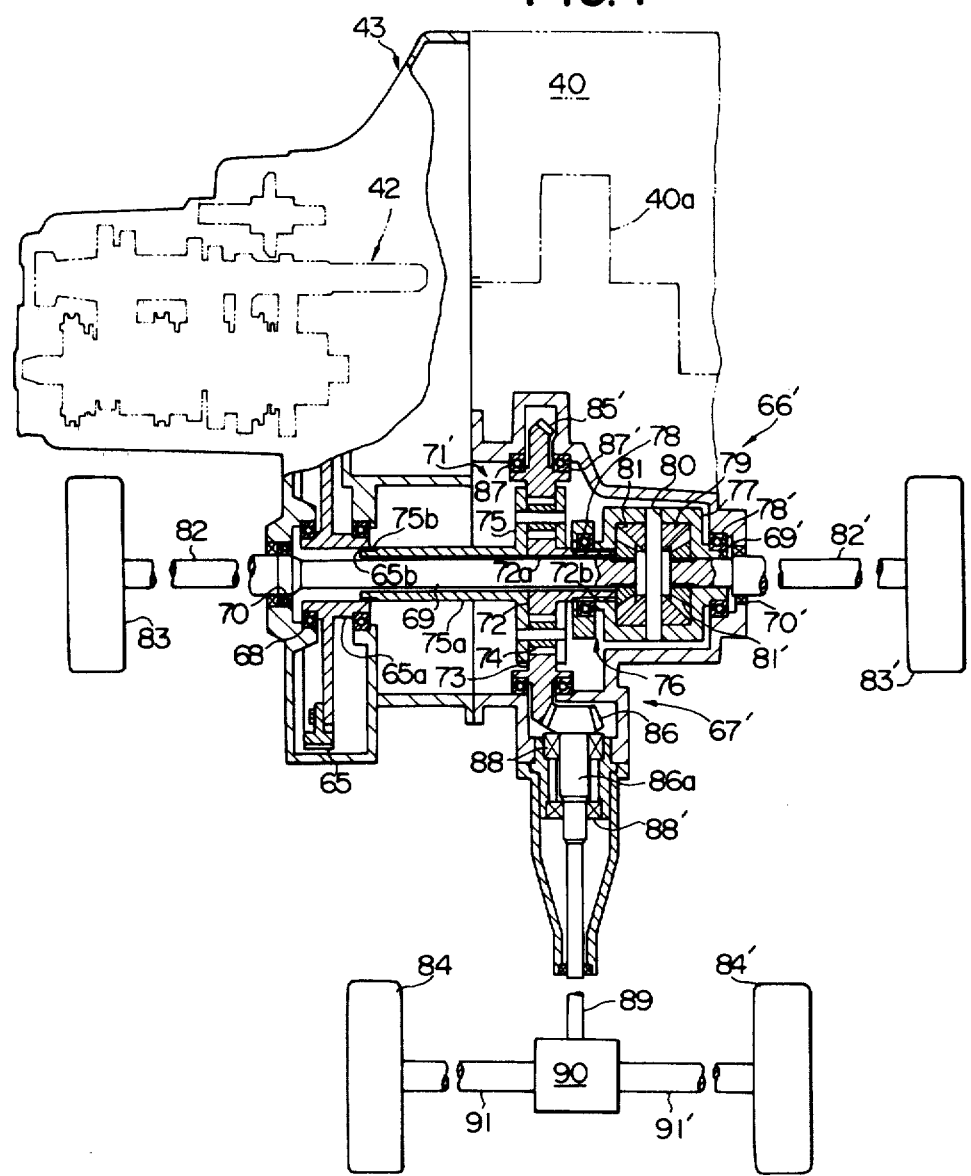

In FIG. 7 is shown a fifth preferred embodiment of a four-wheel drive system according to the present invention. The embodiment herein shown is also basically similar to the embodiment described with reference to FIG. 3 but has a front-wheel drive unit 66' comprising side gear shafts 69 and 69' and a differential-action planetary gear assembly 71' constructed and arrangement hereinafter described.

The planetary gear assembly 71' comprises an axially bored, externally toothed sun gear 72 coaxially surrounding an axial portion of the side gear shaft 69, an internally toothed ring gear 73 coaxially encircling the sun gear 72 and two or more planet pinions 74 each intervening between the sun gear 72 and the ring gear 73. The sun gear 72 is rotatable about an axis aligned with the axis of rotation of the intermediate drive gear 65 and is formed with an axial bore. The planet pinions 74 are held in mesh with both of the sun gear 72 and the ring gear 73 and are connected together by a pinion carrier 75 which is rotatable about the common axis of rotation of the sun gear 72 and the ring gear 73. The planet pinions 74 are, thus, not only rotatable individually about the respective axes of rotation thereof with respect to the pinion carrier 74 but revolvable together about the common axis of rotation of the sun and ring gears 72 and 73 with respect to the transaxle casing 43. The pinion carrier 75 has a hollow axial extension 75a coaxially surrounding an axial portion of the side gear shaft 69 and axially extending toward the axial extension 65a of the intermediate drive gear 65. The axial extension 75a of the pinion carrier 75 has a serrated outer peripheral portion 75b projecting into and splined to the serrated inner peripheral portion 65b of the axial extension of the intermediate drive gear 65. The pinion carrier 75 is, accordingly, rotatable with the drive gear 65 about the center axis of the side gear shaft 69. The sun gear 72 also has a hollow axial extension 72a coaxially surrounding an axial portion of the side gear shaft 69 and axially extending opposite to but in alignment with the axial extension 75a of the pinion carrier 75. The axial extension 72a of the sun gear 72 is formed with an externally serrated outer peripheral portion 72b. On the other hand, the ring gear 73 has an outer peripheral portion forming a driving bevel gear 85' and is rotatably received in the transaxle casing 43 by bearings 87 and 87' as shown.

The side gear shafts 69 and 69' axially extend in opposite directions from the front-wheel differential gear assembly 76 which forms part of the front-wheel drive unit 66'. The differential gear assembly 76 is similar in construction to its counterpart in the embodiment of FIG. 3 and is thus composed of the differential gear casing 77, differential bevel pinions 79, pinion cross shaft 80 and differential side bevel gears 81 and 81', which are all constructed and arranged as described in connection with the embodiment of FIG. 3. The gear casing 77 is rotatably received in the transaxle casing 43 by means of the bearings 78 and 78' and has one of its axial boss portions internally serrated and splined to the serrated outer peripheral portion 72b of the axial extension 72a of the sun gear 72 of the planetary gear assembly 71'. The differential gear casing 77 is thus rotatable about the axis of rotation thereof together with the sun gear 72 of the planetary gear assembly 71'. The side bevel gears 81 and 81' are fixedly connected to or splined to axially inner end portions of the side gear shafts 69 and 69', respectively, extending into the gear casing 77. One side gear shaft 69 axially extends outwardly from the differential gear casing 77 in part through the axial bore in the sun gear 72 and through the axial extension 75a of the pinion carrier 75 and in part through the axial bore in the axial extension 65a of the intermediate drive gear 65. The other side gear shaft 69' axially extends outwardly from the gear casing 77 in the opposite direction to the side gear shaft 69. The side gear shafts 69 and 69' are operatively connected at their axially outer ends to front wheel drive shafts 82 and 82' connected at their outer axial ends to the front wheel axles (not shown) for front road wheels 83 and 83', respectively.

The driving bevel gear 85' constituted by an outer peripheral portion of the ring gear 73 of the planetary gear assembly 71' thus constructed and arranged forms part of right-angle power transfer gear means in a rear-wheel drive gear unit 67'. The right-angle power transfer gear means of the gear unit 67' further comprises a driven bevel gear 86 held in mesh with the driving bevel gear 85'. The driven bevel gear 86 has a rearward axial extension 86a journaled in bearings 88 and 88' received in the rear extension of the transaxle casing 43. Similar to its counterpart in the embodiment of FIG. 3, the driven bevel gear 86 is rotatable about an axis extending at right angles to the axis of rotation of the driving bevel gear 85', viz., in a fore-and-aft direction of the vehicle body. The axial extension 86a of the driven bevel gear 86 projects rearwardly from the rear extension of the transaxle casing 43 and is connected at the rear end thereof to the propeller shaft 89 also extending rearwardly from the gear 86 in a fore-and-aft direction of the vehicle body. The propeller shaft 89 in turn is connected at the rear end thereof to a rear-wheel differential gear assembly 90. The differential gear assembly 90 intervenes between rear-wheel drive shafts 91 and 91' connected at their outer axial ends to the rear wheel axles (not shown) for the rear road wheels 84 and 84', respectively.

When, now, the engine 40 is in operation and the clutch unit 41 is in a coupled condition with any of the forward and reverse drive gear ratios selected in the power transmission gear unit 42 (FIG. 2), driving power is delivered from the output gear 64 of the transmission gear unit 42 to the intermediate drive gear 65 which is held in constant mesh with the transmission output gear 64. The rotation of the intermediate drive gear 65 in turn is carried to the pinion carrier 75 of the planetary gear assembly 71' through the engagement between the respective axial extensions 65a and 75a of the drive gear 65 and the pinion carrier 75. The pinion carrier 75 is accordingly driven for rotation to cause the individual planet pinions 74 to revolve with respect to the transaxle casing 43 around the common axis of rotation of the sun gear 72 and ring gear 74 and to rotate with respect to the pinion carrier 75 about the respective center axes thereof.

The driving power carried to the pinion carrier 75 is, as a consequence, split into two driving power components, one of which is imparted to the sun gear 72 and the other of which is imparted to the ring gear 73. The driving power component imparted to the sun gear 72 is transmitted through the axial extension 72a thereof to the differential gear assembly 76 and drives the differential casing 77. On the other hand, the driving power component imparted to the ring gear 73 is transmitted through the driving bevel gear 85' integral therewith to the driven bevel gear 86 of the rear-wheel drive gear unit 67'. In the differential gear assembly 76 of the front-wheel drive unit 66', the differential gear casing 77 is thus driven for rotation with the sun gear 72 and drives the differential bevel pinions 79 for rotation with the casing 77 about the center axis of the cross shaft 80. The differential bevel pinions 79 in turn drive the differential side bevel gears 81 and 81' for rotation with respect to the gear casing 77 about an axis at right angles to the center axis of the cross shaft 80. Thus, the driving power transmitted to the differential gear assembly 76 is further split into two output components, which are respectively transmitted through the side gear shafts 69 and 69' and front-wheel drive shafts 82 and 82' to the wheel axles for the front road wheels 83 and 83', respectively. On the other hand, the driving power transmitted from the ring gear 73 of the planetary gear assembly 71' to the driven bevel gear 86 of the rear-wheel drive unit 67' causes the driven bevel gear 86 to rotate about the axis thereof in a fore-and-aft direction of the vehicle body. The rotation of the driven bevel gear 86 in turn is transmitted to the propeller shaft 89 and by way of the propeller shaft 89 to the rear-wheel differential gear assembly 90. The rear-wheel differential gear assembly 90 further splits the input driving power into two output power components and drives the rear-wheel drive shafts 91 and 91'. The drive axles for the rear road wheels 84 and 84' are thus driven for rotation about the respective axes thereof.

In the embodiment of the present invention as above described, the planetary gear assembly 71' is operative to split input driving power into two output power components with different revolution speeds. The front road wheels 83 and 83' and the rear road wheels 84 and 84' are thus permitted to rotate at speeds different from one another due to the differential action of the planetary gear assembly 71' or, more specifically, the automatically adjusted difference between the speeds of rotation of the sun and ring gears 72 and 73 thereof. Another advantage of the embodiment of FIG. 7 is that the right-angle power transfer means forming part of the rear-wheel drive gear unit 67' is constructed simply by the combination of the two bevel gears 85' and 86 one of which is constituted as a portion of the ring gear 73 of the planetary gear assembly 71'. The right-angle power transfer gear means of the rear-wheel drive gear unit 67' in the embodiment of FIG. 7 is thus useful for dispensing with the intricate right-angle power transfer gear mechanism required in a prior-art four-wheel drive system of, for example, the type previously described with reference to FIG. 1. A further outstanding advantage is that the component members and elements of the transaxle mechanism in the embodiment of FIG. 7 are largely compatible with those of an existing transaxle mechanism and will for this reason be conducive to reduction of the production cost of a four-wheel vehicle drive system.

Figure 8:
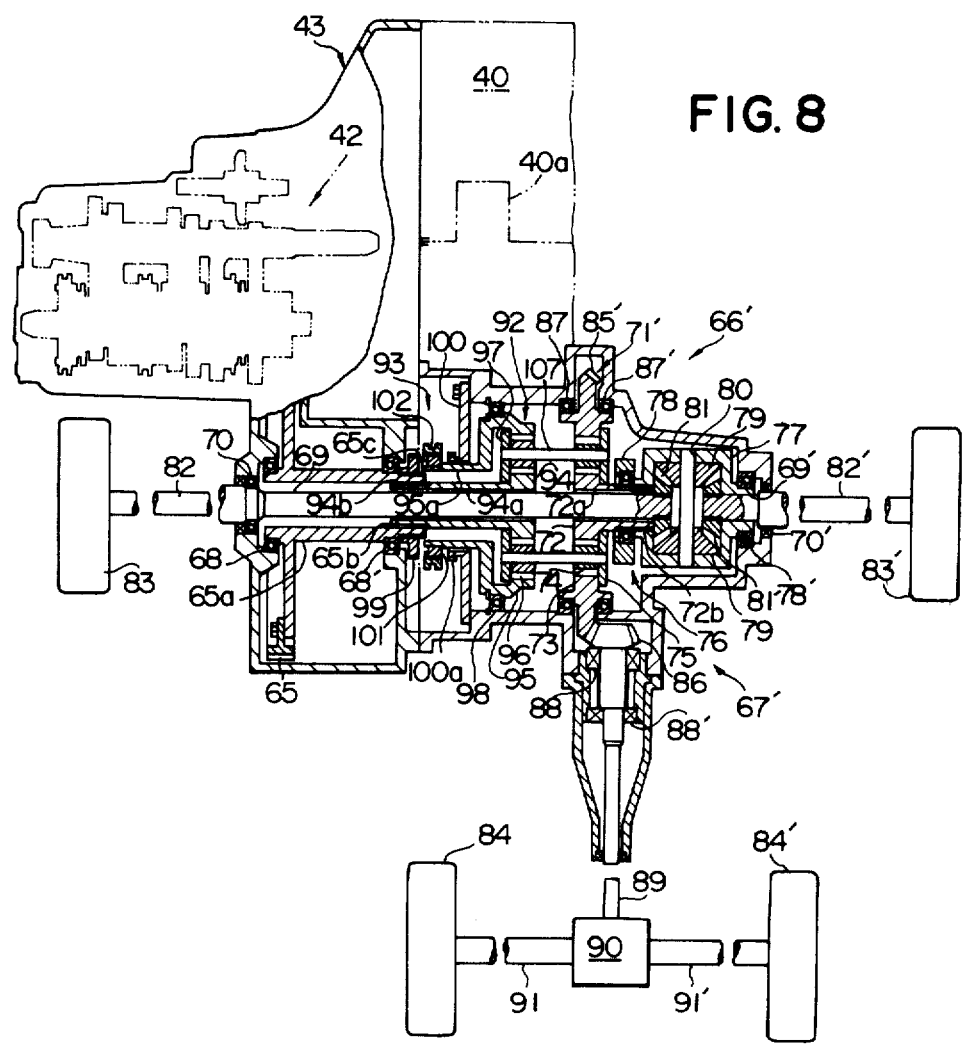

A sixth preferred embodiment of a four-wheel drive system according to the present invention is as shown in FIG. 8. The embodiment herein shown features provision of a second planetary gear assembly 92 in addition to the differential-action or first planetary gear assembly 71' provided in the front-wheel drive unit 66' in the embodiment hereinbefore described with reference to FIG. 7. The second planetary gear assembly 93 forms part of low-and-high speed shifting means which further comprises a low-and-high speed shift clutch mechanism 92 provided in combination with the second planetary gear assembly 92. The low-and-high speed shifting means is similar to the counterpart thereof in the embodiment described with reference to FIG. 4. Thus, the second planetary gear assembly 92 is arranged axially between the intermediate drive gear 65 and the driving bevel gear 85' of the rear-wheel drive gear unit 67' with the driving bevel gear 85' provided axially between the first and second planetary gear assemblies 71' and 92. Furthermore, the axial extension 65a of the intermediate drive gear 65 has an externally serrated outer peripheral portion 65c in addition to the internally serrated inner peripheral portion 65b thereof.

Similar to its counterpart in the embodiment of FIG. 4, the second planetary gear assembly 92 in the embodiment shown in FIG. 8 comprises an externally toothed sun gear 94, an internally toothed ring gear 95 coaxially encircling the sun gear 94 and planet pinions 96 each intervening between the sun gear 94 and the ring gear 95. The planet pinions 96 are held in mesh with the sun gear 94 and the ring gear 95 and are connected together by a pinion carrier 97 rotatable about the common axis of rotation of the sun gear 94 and the ring gear 95. The sun gear 94 has a hollow axial extension 94a coaxially surrounding an axial portion of the side gear shaft 69 and axially extending in alignment with the axial extension 97a of the pinion carrier 97 of the second planetary gear assembly 92 but toward the axial extension 65a of the intermediate drive gear 65. The axial extension 94a of the sun gear 94 has a serrated outer peripheral portion 94b projecting into and splined to the serrated inner peripheral portion 65b of the axial extension 65a of the intermediate drive gear 65. The sun gear 94 is, accordingly, rotatable with the intermediate drive gear 65 about the center axis of the side gear shaft 69. The pinion carrier 97 is coupled to the pinion carrier 75 of the first planetary gear assembly 71' by a plurality of connecting rods 107 extending in parallel with the side gear shaft 69 as shown. The ring gear 95 is rotatably received in the transaxle casing 43 by means of a bearing 98 and has a hollow axial extension 95a coaxially surrounding the axial extension 94a of the sun gear 94.

The low-and-high speed shift clutch mechanism 93 comprises at least three clutch elements consisting of a first clutch element rotatable with the intermediate drive gear 65, a second clutch element secured to the transaxle casing 43, and a third clutch element rotatable with the ring gear 95 of the second planetary gear assembly 92 and selectively engageable with the first and second clutch elements. The utch mechanism 93 is constructed and arranged also similarly to its counterpart in the embodiment of FIG. 4. Thus, the first clutch element thereof is constituted by an externally serrated annular member 99 having a serrated inner peripheral portion splined to the serrated outer peripheral portion 65c of the axial extension 65a of the intermediate drive gear 65, while the second clutch element is constituted by a reaction member 100 fixedly attached to the transaxle casing 43. The reaction member 100 is formed with a circular opening allowing the hollow axial extension 95a of the ring gear 95 to axially extend therethrough toward the axial extension 65a of the intermediate drive gear 65 and has an externally serrated annular portion 100a coaxial with the side gear shaft 69. The axial extension 95a of the ring gear 95 has fixedly mounted on its outer peripheral surface an externally serrated annular sleeve carrier member 101 to which an internally serrated coupling sleeve 102 is splined. The coupling sleeve 102 is axially movable on the sleeve carrier member 101 in a first direction into engagement with the externally serrated annular member 99 and in a second direction into engagement with the externally serrated annular portion 100a of the reaction member 100. The coupling sleeve 102 thus constitutes the above mentioned third clutch element of the low-and-high speed shift clutch mechanism 93. When, in operation, the driving power delivered from the output gear 64 (FIG. 2) of the transmission gear unit 42 is transmitted via the intermediate drive gear 65 to the sun gear 94 of the second planetary gear assembly 92, the planet pinions 96 are driven to rotate with respect to the pinion carrier 97 about the respective center axes thereof and accordingly revolve with respect to the transaxle casing 43 around the common axis of rotation of the sun and ring gears 94 and 95. This causes the pinion carrier 97 to rotate also about the common axis of rotation of the sun and ring gears 94 and 95. If, in this instance, the coupling sleeve 102 of the low-and-high speed shift clutch mechanism 93 is held in the axial position engaging the externally serrated annular member 99, the intermediate drive gear 65 is drivingly connected not only to the sun gear 94 but also to the ring gear 95 of the planetary gear assembly 92 through the annular member 99, the coupling sleeve 102 and the sleeve carrier member 101 on the axial extension 95a of the ring gear 95. Under these conditions, the sun gear 94, ring gear 95, planet pinions 96 and pinion carrier 97 are driven for rotation as a single unit about the center axis of the sun gear 94. The pinion carrier 75 of the second planetary gear assembly 92 is therefore driven for rotation at a speed equal to the revolution speed of the intermediate drive gear 65. If, however, the coupling sleeve 102 of the clutch mechanism 93 is held in the axial position engaging the serrated annular portion 100a of the reaction member 100, then the sleeve carrier member 101 and accordingly the ring gear 95 of the planetary gear assembly 92 are locked up to the transaxle casing 43 so that the ring gear 95 is held at a standstill. Under these conditions, the pinion carrier 97 is driven for rotation about the common axis of rotation of the sun and ring gears 94 and 95 at a speed lower than and proportional to the revolution speed of the intermediate drive gear 65. Driving power is thus transmitted from the intermediate drive gear 65 to the second planetary gear assembly 92 at two different speeds depending upon the axial positions of the coupling sleeve 102 with respect to the annular member 99 on the axial extension 65a of the intermediate drive gear 65 and the reaction member 100 secured to the transaxle casing 43. The second planetary gear assembly 92 delivers its output driving power from the pinion carrier 97 thereof to the pinion carrier 75 of the first planetary gear assembly 71' through the connecting rods 107, thereby enabling the first planetary gear assembly 71' to deliver two driving power components from the sun and ring gears 72 and 73, respectively, thereof, as in the embodiment of FIG. 3.

Figure 9:
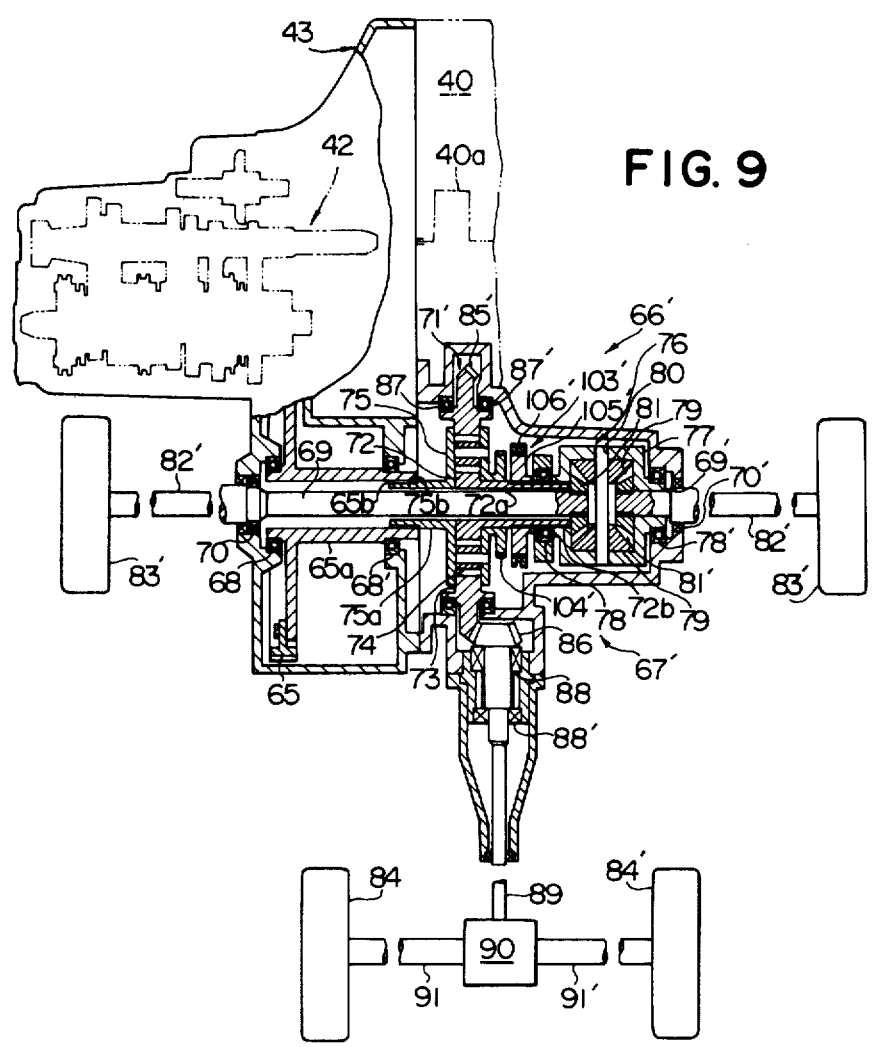

A seventh preferred embodiment of a four-wheel drive system according to the present invention is shown in FIG. 9. The embodiment herein shown features provision of a lock-up clutch mechanism 103' in combination with the differential-action planetary gear assembly 71' of the front-wheel drive unit 66' as in the embodiment of FIG. 5. The embodiment herein shown is in other respects constructed and arranged similarly to the embodiment hereinbefore described with reference to FIG. 7. In the embodiment shown in FIG. 9, the lock-up clutch mechanism 103' is also adapted to have the pinion carrier 75 of the first planetary gear assembly 71' selectively locked up through the clutch mechanism 103' to the sun gear 72 so as to neutralize the differential action of the planetary gear assembly 71' and to enable the driving bevel gear 85' of the rear-wheel drive gear unit 67 to be driven for rotation with the intermediate drive gear 65 when desired.

The lock-up clutch mechanism 103' to achieve such a purpose comprises at least three clutch elements consisting of a first clutch element rotatable with the intermediate drive gear 65, a second clutch element rotatable with the sun gear 72 of the planetary gear assembly 71', and a third clutch element rotatable with one of the first and second clutch elements and axially movable selectively into and out of engagement with the other of the first and second clutch elements. In the embodiment herein shown, the first and second clutch elements are arranged in series between the planetary assembly 71' and the differential gear assembly 76 and are constituted respectively by an externally serrated annular member 104' formed by a portion of the pinion carrier 75 and an externally serrated annular member 105' secured or splined to the axial extension 72a of the sun gear 72 and located axially adjacent to the annular member 104'. On the other hand, the third clutch element of the lock-up clutch mechanism 103' is constituted by an internally serrated coupling sleeve 106' which is splined to one of the annular members such as the annular member 105' as shown and is axially movable on the annular member 105' selectively into and out of engagement with the externally serrated annular member 104'.

When, in operation, the driving power delivered from the output gear 64 (FIG. 2) of the transmission gear unit 42 is transmitted via the intermediate drive gear 65 to the pinion carrier 75 of the planetary gear assembly 71', the driving power thus carried to the pinion carrier 75 is split into two driving power components, one of which is imparted to the sun gear 72 and the other of which is imparted to the ring gear 73 as previously described in regard to the embodiment of FIG. 7. The driving power component imparted to the sun gear 72 is transmitted to the differential gear assembly 76 and drives the differential casing 77, while the driving power component imparted to the ring gear 73 is transmitted to the driving bevel gear 85' of the rear-wheel drive gear unit 67'.

If, in this instance, the coupling sleeve 106' on the externally serrated annular member 105 on the axial extension 72a of the sun gear 72 is held in the axial position disengaged from the externally serrated annular member 104' integral with the pinion carrier 75, the sun gear 72 of the planetary gear assembly 71' is permitted to rotate at a speed different from the speed of rotation of the pinion carrier 75. The planetary gear assembly 71' is thus enabled to produce a differential speed between the sun gear 72 and the ring gear 73 thereof and as a consequence, a differential speed between each of the front road wheels 83 and 83' and each of the rear road wheels 84 and 84'. If, on the other hand, the coupling sleeve 106' of the clutch mechanism 103' is held in the axial position engaging the serrated annular member 104' integral with the pinion carrier 75, then the sun gear 72 of the planetary gear assembly 71' is caused to rotate with the pinion carrier 75. The pinion carrier 75 being thus locked up to the sun gear 72, all the rotary elements of the planetary gear assembly 71' and the driving bevel gear 85' integral with the ring gear 73 are caused to rotate as a single unit with the intermediate drive gear 65. Under these conditions, the differential action of the planetary gear assembly 71' is neutralized so that the front-wheel differential gear assembly 76 and the rear-wheel drive gear unit 67', respectively are driven with power components at equal speeds.

Figure 10:
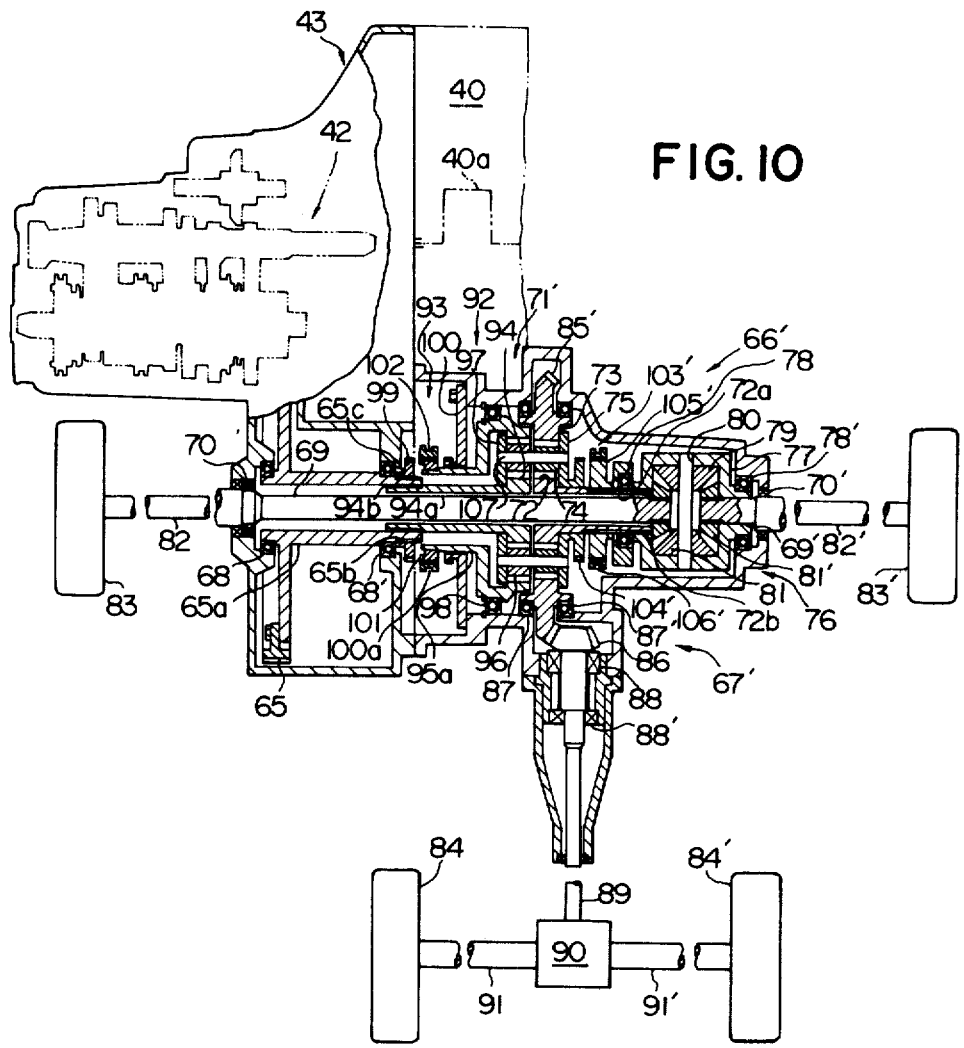

An eighth preferred embodiment of a four-wheel drive system according to the present invention is shown in FIG. 10. The embodiment herein shown is also similar to the fifth, sixth and seventh embodiments shown in FIGS. 7, 8 and 9 but features provision of both the second planetary gear assembly 92 and low-and-high speed shift clutch mechanism 93 provided in the sixth embodiment shown in FIG. 8 and the lock-up clutch mechanism 103' provided in the seventh embodiment of FIG. 9. In the embodiment shown in FIG. 10, the lock-up clutch mechanism 103' is provided axially intermediate between the first and second planetary gear assemblies 71' and the differential gear assembly 76. The construction and arrangement of the four-wheel drive system shown in FIG. 10 and accordingly the manners in which the system is to operate will therefore be apparent from the description regarding the fifth, sixth and seventh embodiments of the present invention as thus far made with reference to FIGS. 7, 8 and 9, respectively.

What is claimed is:

1. A four-wheel drive system for a vehicle having at least first and second pairs of road wheels, comprising
a power unit having an output shaft rotatable about an axis in a lateral direction of the vehicle;
a power transmission gear unit including transmission input and output shafts each having an axis of rotation parallel with an extension of the axis of rotation of the output shaft of said power unit;
an intermediate drive gear rotatable about an axis parallel with the respective axes of rotation of the transmission input and output shafts, the transmission output shaft being held in driving engagement with said drive gear;
a first wheel drive unit comprising differential-action power splitting means operative to split driving power from said drive gear into two power components and a differential gear assembly operative to transmit one of the two power components to the first pair of road wheels;
a second wheel drive unit comprising right-angle power transfer gear means engaging said differential-action power splitting means and operative to transmit therethrough the other of said two driving power components in a fore-and-aft direction of the vehicle; and
a driveline operatively intervening between said right-angle power transfer gear means and said second pair of road wheels and adapted to be driven by the driving power component tansmitted through the right-angle power transfer gear means;
said differential-action power splitting means comprising a first planetary gear assembly which comprises an externally toothed sun gear rotatable about an axis parallel with the axis of rotation of said intermediate drive gear, an internally toothed ring gear coaxially encircling the sun gear and rotatable about the axis of rotation of the sun gear and a pinion carrier rotatable about the common axis of rotation of the sun and ring gears and carrying at least one planet pinion held in mesh with the sun gear and the ring gear and rotatable with respect to the pinion carrier about an axis parallel with said common axis, one of said sun gear and said ring gear being held in driving engagement with said differential gear assembly and the other of the sun and ring gears being held in driving engagement with said right-angle power transfer means, said right-angle power transfer gear means including a driven gear rotatable about an axis in a fore-and-aft direction of the vehicle, said driveline operatively intervening between the driven gear and said second pair of road wheels.

2. A four-wheel drive system as set forth in claim 1, in which said sun gear is held in driving engagement with said differential gear assembly and said ring gear is held in said right-angle power transfer gear means and in which said driving bevel gear is integral with said ring gear.

3. A four-wheel drive system for a vehicle having at least first and second pairs of road wheels, comprising
a power unit having an output shaft rotatable about an axis in a lateral direction of the vehicle;
a power transmission gear unit including transmission input and output shafts each having an axis of rotation parallel with an extension of the axis of rotation of the output shaft of said power unit;
an intermediate drive gear rotatable about an axis parallel with the respective axes of rotation of the transmission input and output shafts, the transmission output shaft being held in driving engagement with said drive gear;
a first wheel drive unit comprising differential-action power splitting means operative to split driving power from said drive gear into two power components and a differential gear assembly operative to transmit one of the two power components to the first pair of road wheels;
a second wheel drive unit comprising right-angle power transfer gear means engaging said differential-action power splitting means and operative to transmit therethrough the other of said two driving power components in a fore-and-aft direction of the vehicle; and
a driveline operatively intervening between said right-angle power transfer gear means and said second pair of road wheels and adapted to be driven by the driving power component transmitted through the right-angle powr transfer gear means;
said differential-action power splitting means comprising a first planetary gear assembly which comprises an externally toothed sun gear rotatable about an axis parallel with the axis of rotation of said intermediate drive gear, an internally toothed ring gear coaxially encircling the sun gear and rotatable about the axis of rotation of the sun gear and a pinion carrier rotatable about the common axis of rotation of the sun and ring gears and carrying at least one planet pinion held in mesh with the sun gear and the ring gear and rotatable with respect to the pinion carrier about an axis parallel with said common axis, one of said sun gear and said ring gear being held in driving engagement with said differential gear assembly and the other of the sun and ring gears being held in driving engagement with said right-angle power transfer means, said right-angle power transfer gear means including a driven gear rotatable about an axis in a fore-and-aft direction of the vehicle, said driveline operatively intervening between the driven gear and said second pair of road wheels; and low-and-high speed shifting means operatively intervening between said intermediate drive gear and said differential-action power splitting means, the low-and-high speed shifting means comprising a second planetary gear assembly axially arranged in series with said first planetary gear assembly and a low-and-high speed shift clutch mechanism operatively intervening between said intermediate gear and said second planetary gear assembly, the second planetary gear assembly comprising an externally toothed sun gear rotatable about an axis aligned with the axis of rotation of the sun gear of the first planetary gear assembly, an internally toothed ring gear coaxially encircling and rotatable about the axis of rotation of the sun gear of the second planetary gear assembly and a pinion carrier rotatable about the common axis of rotation of the sun and ring gears of the second planetary gear assembly and carrying at least one planet pinion held in mesh with the sun gear and the ring gear of the second planetary gear assembly and rotatable with respect to the pinion carrier of the second planetary gear assembly about an axis parallel with the common axis of rotation of the sun and ring gears of the second planetary gear assembly, said intemediate drive gear being in driving engagement with the sun gear of the second planetary gear assembly, the pinion carrier of the second planetary gear assembly being drivingly connected to the rotatable with the pinion carrier of said first planetary gear assembly, and said low-and-high speed shift clutch mechanism being operative to provide coupling selectively between said intermediate drive gear and the ring gear of the second planetary gear assembly and between the ring gear of the second planetary gear assembly and a stationary member fixed in the vehicle.

4. A four-wheel drive system as set forth in claim 3, in which said low-and-high speed shift clutch mechanism comprises a first clutch element rotatable with said intermediate drive gear, a second clutch element stationary with respect to said stationary member, and a third clutch element rotatable with the ring gear of said second planetary gear assembly and movable in a first direction into engagement with the first clutch element and in a second direction into engagement with the second clutch element.

5. A four-wheel drive system as set forth in claim 3, further comprising a lock-up clutch mechanism which is operatively intervening between the pinion carrier of said first planetary gear assembly and the sun gear of the first planetary gear assembly and which is operative to couple together the sun gear and the pinion carrier of the first planetary gear assembly when actuated.

6. A four-wheel drive system as set forth in claim 5, in which said lock-up clutch mechanism comprises first and second clutch elements rotatable with said pinion carrier and said sun gear, respectively, of said first planetary gear assembly, and a third clutch element rotatable with one of the first and second clutch elements and movable selectively into and out of engagement with the other of the first and second clutch elements.

7. A four-wheel drive system as set forth in any one of claims 1, 2, 3, 4, 5 and 6, in which the sun gear and ring gear of said first planetary gear assembly are held in driving engagement with said differential gear assembly and said right-angle power transfer means, respectively.

8. A four-wheel drive system as set forth in any one of claims 1, 2, 3, 4, 5 and 6, in which the ring gear and sun gear of said first planetary gear assembly are held in driving engagement with said differential gear assembly and said right-angle power transfer means, respectively.

9. A four-wheel drive system as set forth in any one of claims 3, 4, 5 and 6, in which said second planetary gear assembly is positioned axially between said intermediate drive gear and said first planetary gear assembly and in which said first planetary gear assembly is positioned axially between said second planetary gear assembly and said differential gear assembly.

10. A four-wheel drive system as set forth in any one of claims 1, 2, 3 and 4, in which said right-angle power transfer gear means comprises a driving bevel gear rotatable about an axis parallel with said common axis of rotation of the sun and ring gears of said planetary gear assembly and in which one of the sun and ring gears of said first planetary gear assembly is held in driving engagement with said driving bevel gear, said driven gear of the right-angle power transfer gear means being constituted by a driven bevel gear which is held in mesh with said driving bevel gear, said second planetary gear assembly being positioned axially between said intermediate drive gear and said first planetary gear assembly, said first planetary gear assembly being positioned axially between said second planetary gear assembly and said differential gear assembly and said driving bevel gear being positioned axially between said first planetary gear assembly and said second planetary gear assembly.

11. A four-wheel drive system as set forth in claim 10, in which the sun gear and ring gear of said first planetary gear assembly are held in driving engagement with said driving bevel gear and said differential gear assembly, respectively.

12. A four-wheel drive system as set forth in claim 10, in which the sun gear and ring gear of said first planetary gear assembly are held in driving engagement with said differential gear assembly and said driving bevel gear, respectively.

13. A four-wheel drive system as set forth in claim 3, further comprising a lock-up clutch mechanism operative to couple together the sun gear and the pinion gear of said first planetary gear assembly when actuated, said right-angle power transfer gear means comprising a driving bevel gear rotatable about an axis parallel with said common axis of rotation of the sun and ring gears of said planetary gear assembly, one of the sun and ring gears being held in driving engagement with said driving bevel gear, said driven gear of said right-angle power transfer gear means being constituted by a driven bevel gear which is held in mesh with said driving bevel gear, said second planetary gear assembly being positioned axially between said intermediate drive gear and said first planetary gear assembly, said first planetary gear assembly being positioned axially between said second planetary gear assembly and said differential gear assembly, said driving bevel gear being positioned axially between said first planetary gear assembly and said second planetary gear assembly and said lock-up clutch mechanism being positioned axially between said second planetary gear assembly and said driving bevel gear.

14. A four-wheel drive system as set forth in claim 13, in which the sun gear and ring gear of said first planetary gear assembly are held in driving engagement with said driving bevel gear and said differential gear assembly, respectively.

15. A four-wheel drive system as set forth in claim 13, in which the sun gear and ring gear of said first planetary gear assembly are held in driving engagement with said differential gear assembly and said driving bevel gear, respectively.

16. A four-wheel drive system as set forth in either of claims 3 and 4, in which said right-angle power transfer gear means comprises a driving bevel gear rotatable about an axis parallel with said common axis of rotation of the sun and ring gears of said planetary gear assembly and in which one of the sun and ring gears of said first planetary gear assembly is held in driving engagement with said driving bevel gear, said driven gear of the right-angle power transfer gear means being constituted by a driven bevel gear which is held in mesh with said driving bevel gear, said second planetary gear assembly being positioned axially between said intermediate drive gear and said first planetary gear assembly, said first planetary gear assembly being positioned axially between said second planetary gear assembly and said differential gear assembly and said driving bevel gear being positioned in coaxially encircling relationship to said first planetary gear assembly.

17. A four-wheel drive system as set forth in claim 16, in which the sun gear and ring gear of said first planetary gear assembly are held in driving engagement with said driving bevel gear and said differential gear assembly, respectively.

18. A four-wheel drive system as set forth in claim 17, in which the sun gear and ring gear of said first planetary gear assembly are held in driving engagement with said differential gear assembly and said driving bevel gear, respectively.

19. A four-wheel drive system as set forth in claim 18, in which said driving bevel gear of said right-angle power transfer gear means is integral with the ring gear of said first planetary gear assembly.

20. A four-wheel drive system as set forth in claim 3, further comprising a lock-up clutch mechanism operative to couple together the sun gear and the pinion gear of said first planetary gear assembly when actuated, said right-angle power transfer gear means comprising a driving bevel gear rotatable about an axis parallel with said common axis of rotation of the sun and ring gears of said planetary gear assembly, one of the sun and ring gears being held in driving engagement with said driving bevel gear, said driven gear of said right-angle power transfer gear means being constituted by a driven bevel gear which is held in mesh with said driving bevel gear, said second planetary gear assembly being positioned axially between said intermediate drive gear and said first planetary gear assembly, said first planetary gear assembly being positioned axially between said second planetary gear assembly and said differential gear assembly, said driving bevel gear being positioned in coaxially encircling relationship to said first planetary gear assembly and said second planetary gear assembly and said lock-up clutch mechanism being positioned axially between said first planetary gear assemply and said differential gear assembly.

21. A four-wheel drive system as set forth in claim 20, in which the sun gear and ring gear of said first planetary gear assembly are held in driving engagement with said driving bevel gear and said differential gear assembly, respectively.

22. A four-wheel drive system as set forth in claim 20, in which the sun gear and ring gear of said first planetary gear assembly are held in driving egagement with said differential gear assembly and said driving bevel gear, respectively.

23. A four-wheel drive system as set forth in claim 27, in which said driving bevel gear of said right-angle power transfer gear means is integral with the ring gear of said first planetary gear assembly.

* * * * *